(12) United States Patent
Schondorf et al.

(10) Patent No.: US 7,158,870 B2
(45) Date of Patent: Jan. 2, 2007

(54) POST COLLISION RESTRAINTS CONTROL MODULE

(75) Inventors: Steven Yellin Schondorf, Dearborn, MI (US); Paul Kevin Kula, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 09/683,605

(22) Filed: Jan. 24, 2002

(65) Prior Publication Data

US 2003/0139864 A1    Jul. 24, 2003

(51) Int. Cl.
B60R 22/00    (2006.01)

(52) U.S. Cl. ............... 701/45; 701/35; 280/735; 340/438

(58) Field of Classification Search ........... 701/45, 701/301, 1, 35, 36, 30; 280/734, 735; 307/10.1; 340/436, 438; 180/271
See application file for complete search history.

(56) References Cited

U.S. PATENT DOCUMENTS

| | | | |
|---|---|---|---|
| 3,514,610 A | | 5/1970 | Huston et al. |
| 3,921,463 A | * | 11/1975 | Robbins ............ 73/492 |
| 3,964,016 A | * | 6/1976 | Yamada et al. ......... 180/274 |
| 4,257,703 A | | 3/1981 | Goodrich |
| 4,381,829 A | | 5/1983 | Montaron |
| 4,623,966 A | | 11/1986 | O'Sullivan |
| 4,638,289 A | | 1/1987 | Zottnik |
| 4,673,937 A | | 6/1987 | Davis |
| 4,833,469 A | | 5/1989 | David |
| 4,851,705 A | * | 7/1989 | Musser et al. ........ 307/10.1 |
| 4,916,450 A | | 4/1990 | Davis |
| 4,933,570 A | * | 6/1990 | Swart et al. ......... 307/10.1 |
| 4,969,103 A | | 11/1990 | Maekawa |
| 4,992,943 A | | 2/1991 | McCracken |
| 4,994,972 A | | 2/1991 | Diller |
| 4,999,775 A | * | 3/1991 | Muraoka ............ 701/34 |
| 5,040,118 A | | 8/1991 | Diller |
| 5,063,603 A | | 11/1991 | Burt |
| 5,091,726 A | | 2/1992 | Shyu |
| 5,162,794 A | | 11/1992 | Seith |
| 5,166,881 A | | 11/1992 | Akasu |
| 5,173,859 A | | 12/1992 | Deering |
| 5,182,459 A | | 1/1993 | Okano et al. |
| 5,230,400 A | | 7/1993 | Kakinami et al. |
| 5,234,071 A | | 8/1993 | Kajiwara |
| 5,249,157 A | | 9/1993 | Taylor |
| 5,307,136 A | | 4/1994 | Saniyoshi |
| 5,314,037 A | | 5/1994 | Shaw et al. |
| 5,430,432 A | | 7/1995 | Camhi et al. |
| 5,432,385 A | * | 7/1995 | Kincaid et al. ........ 307/10.1 |
| 5,467,283 A | | 11/1995 | Butsuen et al. |

(Continued)

FOREIGN PATENT DOCUMENTS

EP    0720928 A2    10/1996

(Continued)

*Primary Examiner*—Thomas Black
*Assistant Examiner*—Brian J. Broadhead
(74) *Attorney, Agent, or Firm*—Frank A. MacKenzie; Artz & Artz, P.C.

(57) ABSTRACT

A restraints control module (RCM) for a vehicle is provided including a memory device. The memory device stores a deployment time of a deployment event. A controller is electrically coupled to the memory device and deploys a restraint in response to a collision signal and stores the deployment time in the memory device. A method of time stamping and indicating a deployment event within an automotive vehicle, having a RCM, is also provided.

7 Claims, 2 Drawing Sheets

U.S. PATENT DOCUMENTS

| | | | |
|---|---|---|---|
| 5,479,173 A | 12/1995 | Yoshioka et al. | |
| 5,502,432 A | 3/1996 | Ohmamyuda et al. | |
| 5,521,580 A | 5/1996 | Kaneko et al. | |
| 5,526,269 A | 6/1996 | Ishibashi et al. | |
| 5,534,870 A | 7/1996 | Avignon et al. | |
| 5,541,590 A | 7/1996 | Nishio | |
| 5,552,986 A | 9/1996 | Omura et al. | |
| 5,572,428 A | 11/1996 | Ishida et al. | |
| 5,574,463 A | 11/1996 | Shirai et al. | |
| 5,594,414 A | 1/1997 | Namngani | |
| 5,602,760 A | 2/1997 | Chacon et al. | |
| 5,604,683 A | 2/1997 | Roecker | |
| 5,629,847 A | 5/1997 | Shirakawa et al. | |
| 5,635,922 A | 6/1997 | Cho et al. | |
| 5,646,612 A | 7/1997 | Byon | |
| 5,680,097 A | 10/1997 | Uemura et al. | |
| 5,684,474 A | 11/1997 | Gilon et al. | |
| 5,689,264 A | 11/1997 | Ishikawa et al. | |
| 5,699,040 A | 12/1997 | Matsuda | |
| 5,699,057 A | 12/1997 | Ikeda et al. | |
| 5,710,565 A | 1/1998 | Shirai et al. | |
| 5,745,870 A | 4/1998 | Yamamoto et al. | |
| 5,748,477 A | 5/1998 | Katoh | |
| 5,749,426 A | 5/1998 | Gilling | |
| 5,751,211 A | 5/1998 | Shirai et al. | |
| 5,751,836 A | 5/1998 | Wildes et al. | |
| 5,754,099 A | 5/1998 | Nishimura et al. | |
| 5,771,481 A | 6/1998 | Gilling | |
| 5,779,264 A | 7/1998 | Demesseman et al. | |
| 5,808,561 A | 9/1998 | Kinoshita et al. | |
| 5,815,093 A | 9/1998 | Kikinis | |
| 5,835,007 A | 11/1998 | Kosiak | |
| 5,835,873 A | 11/1998 | Darby et al. | |
| 5,838,228 A | 11/1998 | Clark | |
| 5,847,472 A | 12/1998 | Byon | |
| 5,847,755 A | 12/1998 | Wixson et al. | |
| 5,850,085 A * | 12/1998 | Rosenbluth | 250/559.21 |
| 5,872,536 A | 2/1999 | Lyons et al. | |
| 5,905,457 A | 5/1999 | Rashid | |
| 5,906,393 A | 5/1999 | Mazur et al. | |
| 5,920,345 A | 7/1999 | Sauer | |
| 5,926,126 A | 7/1999 | Engelman | |
| 5,936,549 A | 8/1999 | Tsuchiya | |
| 5,938,714 A | 8/1999 | Satonaka | |
| 5,948,026 A | 9/1999 | Beemer, II et al. | |
| 5,949,366 A | 9/1999 | Herrman | |
| 5,949,918 A | 9/1999 | McCaffrey | |
| 5,955,967 A | 9/1999 | Yamada | |
| 5,959,552 A | 9/1999 | Cho | |
| 5,963,272 A | 10/1999 | Wixson | |
| 5,964,822 A | 10/1999 | Alland et al. | |
| 5,983,161 A | 11/1999 | Lemelson et al. | |
| 5,995,037 A | 11/1999 | Matsuda et al. | |
| 5,999,117 A | 12/1999 | Engel | |
| 5,999,874 A | 12/1999 | Winner et al. | |
| 6,002,983 A | 12/1999 | Alland et al. | |
| 6,018,308 A | 1/2000 | Shirai | |
| 6,025,797 A | 2/2000 | Kawai et al. | |
| 6,026,340 A | 2/2000 | Corrado et al. | |
| 6,031,484 A | 2/2000 | Bullinger et al. | |
| 6,037,860 A | 3/2000 | Zander et al. | |
| 6,044,166 A | 3/2000 | Bassman et al. | |
| 6,044,321 A | 3/2000 | Nakamura et al. | |
| 6,049,619 A | 4/2000 | Anandan et al. | |
| 6,061,015 A | 5/2000 | Sugimoto | |
| 6,076,028 A | 6/2000 | Donnelly et al. | |
| 6,084,508 A | 7/2000 | Mai et al. | |
| 6,085,151 A | 7/2000 | Farmer et al. | |
| 6,087,928 A | 7/2000 | Kleinberg et al. | |
| 6,088,639 A | 7/2000 | Fayyad et al. | |
| 6,094,159 A | 7/2000 | Osterfeld et al. | |
| 6,097,332 A | 8/2000 | Crosby, II | |
| 6,114,951 A | 9/2000 | Knioshita et al. | |
| 6,121,896 A | 9/2000 | Rahman | |
| 6,148,943 A | 11/2000 | Kodaka et al. | |
| 6,151,539 A | 11/2000 | Bergholz et al. | |
| 6,157,892 A | 12/2000 | Hada et al. | |
| 6,161,074 A | 12/2000 | Sielagoski et al. | |
| 6,168,198 B1 | 1/2001 | Breed et al. | |
| 6,169,479 B1 | 1/2001 | Boran et al. | |
| 6,175,794 B1 * | 1/2001 | Muraoka | 701/45 |
| 6,177,866 B1 | 1/2001 | O'Connell | |
| 6,185,490 B1 | 2/2001 | Ferguson | |
| 6,186,539 B1 | 2/2001 | Foo et al. | |
| 6,188,316 B1 | 2/2001 | Matsuno et al. | |
| 6,191,704 B1 | 2/2001 | Takenaga et al. | |
| 6,198,999 B1 * | 3/2001 | Ando | 701/45 |
| 6,204,756 B1 | 3/2001 | Senyk et al. | |
| 6,209,909 B1 | 4/2001 | Breed | |
| 6,218,960 B1 | 4/2001 | Ishikawa et al. | |
| 6,219,606 B1 | 4/2001 | Wessels et al. | |
| 6,223,125 B1 | 4/2001 | Hall | |
| 6,225,918 B1 | 5/2001 | Kam | |
| 6,226,389 B1 | 5/2001 | Lemelson et al. | |
| 6,229,438 B1 | 5/2001 | Kutlucinar et al. | |
| 6,231,075 B1 * | 5/2001 | Otsu | 280/735 |
| 6,246,961 B1 | 6/2001 | Sasaki et al. | |
| 6,249,738 B1 | 6/2001 | Higashimata et al. | |
| 6,256,584 B1 | 7/2001 | Kodaka et al. | |
| 6,259,992 B1 | 7/2001 | Urai et al. | |
| 6,462,649 B1 * | 10/2002 | Kimura | 340/435 |
| 2002/0091474 A1 * | 7/2002 | Okada | 701/35 |
| 2002/0158805 A1 * | 10/2002 | Turnbull et al. | 343/713 |
| 2002/0184062 A1 * | 12/2002 | Diaz | 705/7 |

FOREIGN PATENT DOCUMENTS

| | | |
|---|---|---|
| JP | 54-65934 A | 5/1979 |
| JP | 54065934 A | 5/1979 |
| WO | WO 98/37435 | 8/1998 |
| WO | WO 98/58274 | 12/1998 |

* cited by examiner

POST COLLISION RESTRAINTS CONTROL MODULE

CROSS REFERENCE TO RELATED APPLICATIONS

The present invention is related to U.S. patent application Ser. No. 09/683,604 entitled "Impact Sensor Post Collision Notification System" filed simultaneously herewith and incorporated by reference herein.

BACKGROUND OF INVENTION

The present invention relates generally to automotive vehicle safety systems, and more particularly to a method and apparatus for time-stamping and indicating restraint deployment events within an automotive vehicle.

Currently, many vehicles have a restraints control module (RCM), which controls of the safety-related restraint systems in a vehicle. The RCM receives collision signals from various impact sensors, during a collision, and determines whether to activate a restraint to decrease the potential of an operator injury during the collision. The restraint may be an air bag, a pretensioner, or other restraint known in the art. The RCM also stores the number of times the vehicle has been in a collision.

RCM systems record fault information that is present when a deployment event occurs, which can be cleared by a technician. Clearing the information prevents existence of any historical data on vehicle impact sensors and the RCM itself. Historical data on the impact sensors and the RCM can provide information as to the status and condition of these devices and allows a determination to be made as to whether the devices should be serviced or replaced. RCM systems are incapable of permanently maintaining a relationship between time of deployment and any faults that may have been present during time of deployment.

Historical data on the impact sensors and the RCM may also aid in discovering sustained damage to these devices that may otherwise be undetectable. Although, the impact sensors and the RCM may be capable of surviving a collision multiple times, undetectable damage may cause them to not operate as originally designed.

It would therefore be desirable to develop an improved RCM that stores time and fault information during a deployment. This information may allow a trained technician or an owner of a vehicle to better understand the status of the impact sensors and the RCM of a vehicle so as to determine whether service or replacement is necessary, thereby providing a safer vehicle.

SUMMARY OF INVENTION

The foregoing and advantages thereof are provided by a method and apparatus for indicating and storing time stamp information of deployment events. A restraints control module (RCM) for a vehicle is provided including a memory device. The memory device stores a deployment time of a deployment event. A controller is electrically coupled to the memory device and deploys a restraint in response to a collision signal and stores the deployment time in the memory device. A method of time stamping and indicating a deployment event within an automotive vehicle, having a RCM, is also provided.

One of several advantages of the present invention is that it provides an apparatus for indicating when an RCM has been on a vehicle that has been in a collision. This allows an operator or technician to determine whether the RCM should be serviced or replaced.

Another advantage of the present invention is that it stores deployment time and fault time information. Deployment time and fault time may then be analyzed to determine whether an impact sensor, a restraint, or the RCM needs to be serviced or replaced.

Furthermore the stored information can not be erased, reset, or overwritten. Therefore, when the RCM is installed into a second vehicle the operator or technician of the second vehicle is able to determine the history of the RCM.

Moreover, the present invention promotes increased safety by decreasing the use of impact sensors, restraints, and RCMs that need servicing or replacement.

The present invention itself, together with attendant advantages, will be best understood by reference to the following detailed description, taken in conjunction with the accompanying figures.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

While the present invention is described with respect to an apparatus and method for time stamping and indicating deployment events within an automotive vehicle the following apparatus and method is capable of being adapted for various purposes and is not limited to the following applications: automotive vehicles, restraint systems, restraint control modules (RCMs), impact sensors, or other sensor applications.

In the following description, various operating parameters and components are described for one constructed embodiment. These specific parameters and components are included as examples and are not meant to be limiting.

Figure 1:
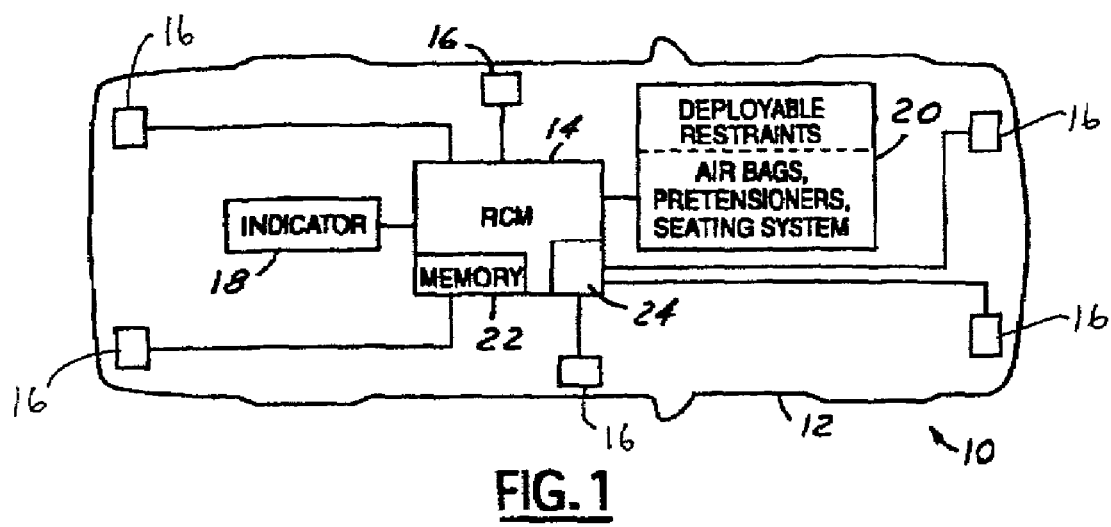
FIG. 1 is a schematic block diagram of a restraints control module system for a vehicle in accordance with an embodiment of the present invention.

Referring now to FIG. 1, a schematic block diagram of an RCM system 10 in accordance with an embodiment of the present invention is shown. The system 10 is shown within an automotive vehicle 12. The system 10 includes a RCM 14, impact sensors 16, an indicator 18, and deployable restraints 20.

RCM 14 may be a microprocessor based controller such as a computer having a central processing unit, a memory device (RAM and/or ROM) 22, and associated inputs and outputs operating in cooperation with a communications bus. RCM 14 may be a portion of a main control unit, such as a main vehicle controller, or be a stand-alone controller. The RCM 14 stores deployment information as to when electrical current is supplied to any deployable device within the automotive vehicle as well as the duration of the deployment event. RCM 14 may have logic to determine whether the impact sensors 16 are functioning properly and determine whether to allow the sensors to continue to function or not. The RCM 14 also stores fault times when the system 10 is not fully functional. The RCM 14 may contain a comparator 24 for comparing deployment times with fault times.

The RCM 14 permanently records a time stamp of its lifetime operating minutes and sets a permanent fault when there is a collision event that results in a deployment of a deployable device. The time stamp includes information about when the deployment energy was supplied to a deployable device and allows a comparison to be performed between the time stamp and other time stamps corresponding to faults within the system 10. The comparison provides a vehicle occupant or a technician information as to when a fault is present at the time of a deployment. The permanent fault causes the indicator 18 to indicate indefinitely that the RCM 14 was at some point in time in a vehicle that has been involved in a collision. Although, the RCM 14 may function after a collision as long as it is not broken, the indicator signals a vehicle occupant that the RCM 14 should be removed from the vehicle 12 and replaced according to a vehicle service manual.

The impact sensors 16 and the deployable restraints 20 may be of various type and style. Impact sensors 16 may include front, side, rear, and oblique impact sensors or other impact sensors known in the art. The deployable restraints 20 may include air bags, pretensioners, seat systems, or other safety restraint devices.

The indicator 18 may be a pulsating indicator, a light bulb, an LED, a fluorescent light, an audible signal, a visual signal, a 7-segment display, an analog gage, a digital meter, a video display, a hazard light, or various other indicators known in the art. Indicator 18 may indicate various information including: whether the RCM has been serviced, a fault when the RCM is malfunctioning, the location of an impact sensor, status of an impact sensor, a fault when an impact sensor is malfunctioning, or various other related information. When the indicator 18 is indicating a fault the RCM 14 continues functioning unless it is not capable of doing so.

Figure 2:
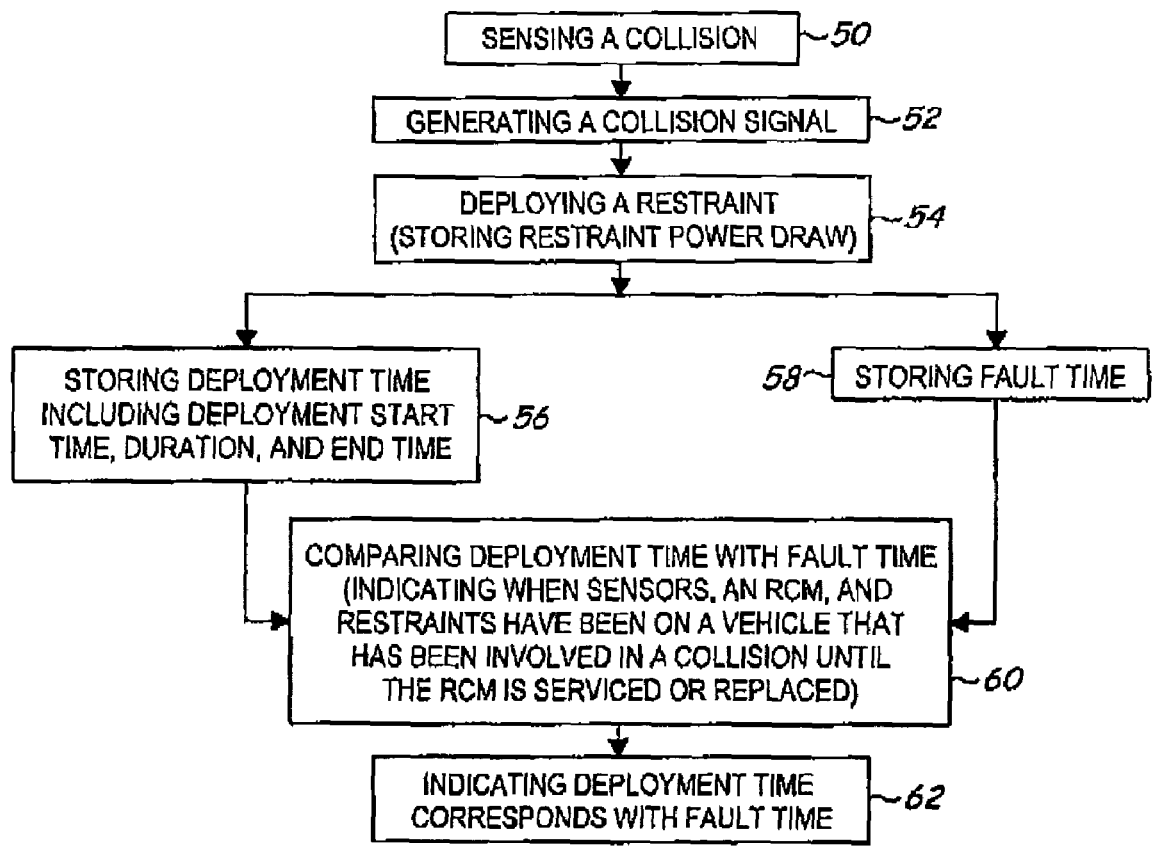
FIG. 2 is a logic flow diagram illustrating a method of time stamping and indicating deployment events for a vehicle in accordance with an embodiment of the present invention.

Referring now to FIG. 2, a logic flow diagram illustrating a method of time stamping and indicating deployment events for the vehicle 12 in accordance with an embodiment of the present invention is shown. A deployment event refers to the length of time during which a deployable restraint is operating. Through-out the described method the RCM 14 may signal the indicator 18 of any faults detected.

In step 50, during a collision involving the vehicle 12 at least one impact sensor of impact sensors 16 is activated.

In step 52, the impact sensor generates a collision signal in response to the sensed collision. The collision signal is then transferred to the RCM 14.

In step 54, the RCM 14 determines, in response to the collision signal, if the magnitude of the collision signal is above a predetermined value and, if so, activates a deployable restraint. The RCM may store the power draw from the activated deployable restraint throughout the deployment event. The stored data of the power draw may be later used in evaluating collision data and determining status of the components in system 10. The RCM 14 then proceeds to steps 56 and 58.

In step 56, the deployment time is stored in memory 22. The deployment time includes the start time of the deployment event and the duration of the deployment. The deployment time may also include other times such as the deployment end time.

In step 58, the RCM 14 determines that a fault has occurred and stores the fault time.

In step 60, the RCM 14 compares the deployment time with the fault time. When the deployment time and the fault time correspond the RCM determines that a deployable restraint may have been prevented from functioning properly and indicates a fault on indicator 18. When an air bag is deployed the RCM 14 automatically indicates a fault on the indicator 18 until the RCM is serviced or replaced.

In step 62, the RCM indicates the deployment time corresponding with the fault time.

The present invention provides a method and device for assuring that historical data stored in a RCM memory is not undesirably erased, reset, or overwritten as to prevent unknowing use of these devices under an assumption that they are virgin devices. The historical data includes information related to impact sensors, the RCM, and deployable restraints that have been on a vehicle that has been involved in a collision.

The present invention in so doing, further provides increased vehicle safety by promoting the use of properly functioning restraint system devices. The present invention therefore, also informs an operator that a restraint system device may need servicing and potentially that the operated vehicle, assuming it has all original factory devices, has been involved in a collision. The operator may upon gathering this information choose to have the vehicle and/or devices serviced or replaced and use the information with discretion when purchasing the vehicle.

The above-described method, to one skilled in the art, is capable of being adapted for various purposes and is not limited to the following applications: automotive vehicles, restraint systems, restraint control modules (RCMs), impact sensors, or other sensor applications. The above-described invention may also be varied without deviating from the true scope of the invention.

The invention claimed is:

1. A restraints control module (RCM) for a vehicle that has at least one impact sensor comprising:
    a memory device for storing a deployment time of a deployment event;
    a comparator comparing said deployment time with a fault time and determining whether said fault time corresponds with said deployment time; and
    a controller electrically coupled to said memory device and said comparator, said controller determining when to deploy a restraint, storing said deployment time, and storing in said memory device a fault time corresponding to said deployment time, said fault time indicative of said fault within a component selected from at least one of the RCM and the at least one impact sensor; and
    an indicator electrically coupled to said controller and indicating when said deployment time corresponds with said fault time.

2. A module as in claim 1 wherein said indicator comprises at least one of: a pulsating indicator, a light bulb, an LED, a fluorescent light, an audible signal, a visual signal, a 7-segment display, an analog gage, a digital meter, a video system, and a hazard light.

3. A module as in claim 1 wherein said controller stores said fault time when said fault time corresponds to said deployment time.

4. A restraints control module (RCM) for a vehicle that has at least one impact sensor comprising:
    an indicator;
    a memory device for storing a deployment start time of a deployment event; and
    a controller electrically coupled to said indicator and said memory device, said controller determining when to deploy a restraint and storing said deployment start time and duration in said memory device;

said controller storing a fault time in said memory device and signaling said indicator when said fault time corresponds to said deployment start time and duration, said fault time indicative of a fault within a component selected from at least one of the RCM and the at least one impact sensor.

5. A module as in claim 4 wherein said indicator continuously indicating that the RCM has been on a vehicle that has been involved in a collision.

6. A module as in claim 4 further comprising a comparator electrically coupled to said controller, said comparator comparing said deployment time with a fault time and determining whether said fault time corresponds with said deployment time.

7. A module as in claim 4 wherein information stored in said memory device is uneraseable, unresettable, and unoverwritable.

* * * * *